United States Patent [19]

Lewarchik et al.

[11] 4,317,894
[45] Mar. 2, 1982

[54] LOW TEMPERATURE CURE COATING COMPOSITIONS

[75] Inventors: Ronald J. Lewarchik, Natrona Heights; Betty J. Carter, Oakmont, both of Pa.

[73] Assignee: PPG Industries, Inc., Pittsburgh, Pa.

[21] Appl. No.: 102,491

[22] Filed: Dec. 11, 1979

[51] Int. Cl.$^3$ .......................................... C08F 283/04
[52] U.S. Cl. ...................................... 525/455; 525/65; 525/66; 525/68; 525/411; 525/412; 525/414; 525/420; 525/423; 525/424; 525/425; 525/426; 525/428; 525/429; 525/437; 525/438; 525/440; 525/441; 525/445; 525/450; 525/451; 525/452; 525/454; 525/456; 525/480; 525/481; 525/509; 525/510; 525/528; 525/529; 525/530

[58] Field of Search ........ 525/440, 428, 429, 424–426, 525/423, 420, 437, 438, 441, 445, 411, 412, 414, 403, 404, 406, 408, 65, 66, 68, 450, 451, 452, 454, 455, 456, 528–530, 480, 481, 509, 510; 260/22 CB

[56] References Cited

U.S. PATENT DOCUMENTS

| | | | |
|---|---|---|---|
| 4,025,407 | 5/1977 | Chang et al. | 525/296 |
| 4,048,036 | 9/1977 | Prucnal | 204/159.23 |
| 4,263,198 | 4/1981 | Feldman et al. | 260/40 R |
| 4,263,417 | 4/1981 | Dyball | 525/169 |

*Primary Examiner*—J. Ziegler
*Attorney, Agent, or Firm*—Charles R. Wilson

[57] ABSTRACT

Coating compositions consist essentially of (a) ethylenically unsaturated monomers, (b) polyol-containing curable resins, (c) resins having ethylenic unsaturation and (d) solvent. The compositions are especially useful for the coating of products made from sheet molding compounds.

11 Claims, No Drawings

LOW TEMPERATURE CURE COATING COMPOSITIONS

BACKGROUND OF THE INVENTION

This invention relates to coating compositions. More particularly, the invention relates to coating compositions capable of a low temperature cure and especially useful for the coating of sheet molding compounds.

Sheet molding compounds are resinous materials which have found widespread use in recent years. The resinous materials are typically based on polyester resins; however, other types of resins can be used. The resins have become popular due to the fact they are durable and oftentimes as strong as metals. The fact they are also lightweight makes the sheet molding compounds especially useful in the automotive industry. One particular end use has been as a replacement for sheet metal in automobiles.

While parts made from sheet molding compounds do have the requisite durability and strength, it is still necessary that they be primed and top-coated for appearance purposes. A good appearance, though, on such substrates has been difficult to obtain. Surface imperfections or craters in the sheet molding compound substrates act as a trap for solvents contained in conventionally used coating compositions; the trapped solvent which eventually escapes adversely affects the appearance of the substrate. Any coating composition must also have good adhesion to the sheet molding compounds as well as have good hardness, solvent resistance and chip resistance. A coating composition possessing the aforementioned requisites has been difficult to formulate. An additional requirement which would be desirable would be for the coating composition to be capable of curing at a low temperature. Such compositions, of course, have a lessened energy demand.

There has now been found coating compositions which are capable of low temperature cure. The compositions have good hardness, solvent resistance, chip resistance, and the ability to hide substrate non-uniformities. They also have good adhesion to products made from sheet molding compounds. Additionally, the compositions can be formulated as high solids compositions.

As used herein, all percentages and ratios are by weight unless otherwise indicated.

SUMMARY OF THE INVENTION

Low organic solvent content coating compositions consist essentially of, on a film-forming resin solids basis, (a) from about 10 percent to about 80 percent of an ethylenically unsaturated monomer, (b) from about 5 percent to about 50 percent of a polyol-containing curable film-forming resin having a hydroxyl value of at least about 10, and (c) from about 5 percent to about 60 percent of a resin having ethylenic unsaturation. From about 5 percent to about 50 percent of a crosslinking agent selected from the group consisting of aminoplast resins, phenoplast resins, isocyanate resins, blocked isocyanate resins and mixtures thereof can be included in the compositions where external curing is needed.

The coating compositions herein are especially useful for the coating of sheet molding compounds and find particular utility in the automotive industry.

DETAILED DESCRIPTION OF THE INVENTION

The coating compositions of this invention consist essentially of ethylenically unsaturated monomers, polyol-containing curable resins, resins having ethylenic unsaturation and solvent. Each of the components of the compositions is described in more detail in the following paragraphs.

Coating compositions of this invention contain as one essential component ethylenically unsaturated monomers. This monomer represents from about 10 percent to about 80 percent, preferably from about 20 percent to about 50 percent of the coating composition. (These percentages, as well as the percents to follow with respect to description of the film-forming components, are expressed on a film-forming resin solids basis.) The ethylenically unsaturated monomers are any one of several monomers capable of free radical polymerization with those monomers having alpha, beta unsaturation being preferred. Classes of such monomers include the vinyl aromatic compounds, unsaturated esters of organic and inorganic acids, unsaturated carboxylic acids, acrylonitriles and substituted acrylonitriles, and acrylamides and substituted acrylamides.

Illustrative of the many unsaturated monomers which are employed in the mixture are vinyl aromatic compounds, such as styrene, alpha-methylstyrene, alpha-ethyl styrene, alpha-butyl styrene, vinyl toluene, alpha-chlorostyrene, alpha-bromostyrene, 2,5-dichlorostyrene, and 2,5-dibromostyrene; unsaturated esters of organic and inorganic acids such as vinyl acetate, vinyl propionate, vinyl butyrate, allyl bromide, allyl chloride, allyl acetate, alkyl or alkenyl esters of acrylic acid, e.g., allyl acrylate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, decyl acrylate, dodecyl acrylate, glycidyl acrylate, dicyclopentenyl-containing acrylate, hexane diol diacrylate, trimethylolpropane triacrylate, 2-hydroxyethylacrylate, and propoxylated bisphenol A diacrylate, alkyl or alkenyl esters of methacrylic acid, e.g., methyl methacrylate, ethyl methacrylate, propyl methacrylate, butyl methacrylate, isobutyl methacrylate, amyl methacrylate, hexyl methacrylate, decyl methacrylate, dicyclopentenyl-containing methacrylate, glycidyl methacrylate, 2-hydroxyethyl methacrylate, hydroxypropyl methacrylate, hydroxylauryl methacrylate, ethylene glycol dimethacrylate, trimethylolpropane trimethacrylate, tetramethylene glycol dimethacrylate, ethoxylated bisphenol A dimethacrylate, and 1,3 butylene dimethacrylate, dimethyl maleate, diethyl maleate, and dimethyl fumarate; unsaturated carboxylic acids such as acrylic acid, methacrylic acid, ethacrylic acid, and crotonic acid; acrylonitriles and substituted acrylonitriles such as acrylonitrile, methacrylonitrile, and ethacrylonitrile; and acrylamides and substituted acrylamides such as acrylamide, methacrylamide, itaconic diamide, N-(methoxymethyl) acrylamide, N-(ethoxymethyl) acrylamide, N-(butoxymethyl) acrylamide, and N-(butoxymethyl) methacrylamide.

The coating compositions also consist essentially of from about 5 percent to about 50 percent, preferably from about 10 percent to about 20 percent of a polyol-containing resin capable of curing with external crosslinking agents or capable of curing by means of internal crosslinking. The polyol resins have a hydroxyl value of at least 10 and are selected from the group consisting of hydrocarbon polyols, ester polyols, ether polyols, polyester polyols, polyether polyols, polyamide polyols, polyurethane polyols, polyurea polyols, cyclic nitrogen-containing polyols, acrylic polyols and mixtures thereof. The following paragraphs describe suitable polyols, with the polyurethane polyols being preferred.

Hydrocarbon polyols include 2-ethyl-1,3-hexanediol; 1,6-hexane diol; trimethyl pentane-1,3-diol; neopentyl glycol; cyclohexyl-1,3-dimethylol; trimethylolpropane; trimethylolethane; glycerol; 1,2,4-butane triol; 1, 2, 6-hexane triol; erythritol; sorbitol; manitol; and diglycerol.

Ester polyols are obtained by reacting a polyol with a monocarboxylic acid. The polyols have a hydroxyl functionality of at least 3.0, examples of which are described immediately above. Suitable monocarboxylic acids include benzoic acid, hexanoic acid, octanoic acid, decanoic acid, lauric acid, myristic acid, stearic acid, oleic acid, linoleic acid and linolenic acid.

Useful ether polyols are made by reacting a suitable polyol as described above with a monoepoxide, e.g., butyl glycidyl ether, octyl glycidyl ether, allyl glycidyl ether, phenyl glycidyl ether, 1,2-butylene oxide, styrene oxide, glycidyl acrylate, and glycidyl methacrylate.

Polyester polyols are generally formed by the esterification of polyols with polycarboxylic acids or acid anhydrides. The lower molecular weight polyester polyols are preferred for high solids compositions. The polyols conventionally employed in making the polyester polyols include alkylene glycols, such as ethylene glycol, propylene glycol, butylene glycol and neopentyl glycol, and other glycols such as hydrogenated bisphenol A, cyclohexanedimethanol, caprolactone-diol reaction products, hydroxyalkylated bisphenols, polyether glycols, e.g., poly (oxytetramethylene) glycol, and similar type compounds. Other diols of various types and polyols of higher functionality can also be used. Such higher polyols include trimethylolpropane, trimethylolethane, pentaerythritol and higher molecular weight polyols, such as obtained by the reaction product of ethylene oxide and trimethylolpropane and various hydrolyzed epoxide resins.

Suitable carboxylic acids used in the reaction with the above-described polyols include phthalic, isophthalic, terephthalic, tetrahydrophthalic, hexahydrophthalic, adipic, azelaic, sebacic, maleic, glutaric, chlorendic, tetrachlorophthalic, maleic, fumaric, itaconic, malonic, trimellitic, suberic, 2-methyl succinic, 3,3-diethyl glutaric, 2,2-dimethyl succinic acid and trimellitic acid. Anhydrides of these acids where they exist can also be employed and are encompassed by the term "carboxylic acid". Monocarboxylic acids such as benzoic acid and hexanoic acid can also be used, provided the average functionality of the polyol is above about 2.0.

It is also possible to produce polyester polyols containing preferably one or two alkylene oxide groups per hydroxy group. Such resins preferably have a molecular weight of 1,000 or less. The alkylene oxide-containing polyester polyol can be produced by substituting an alkylene oxide containing polyol for all or part of the polyol component used to produce the polyester polyol. Useful alkylene oxide containing polyols include diethylene glycol, triethylene glycol, dipropylene glycol, tetraethylene glycol, 2,2-bis (hydroxyethylphenyl) propane and 2,2-bis (betahydroxypropoxyphenyl)-propane. These polyester polyols can also be produced by oxalkylating any one of the above-described polyester polyols.

Polyester polyols can also be made from the reaction of a lactone with a polyol. The lactones, commercially available, are represented by the structure:

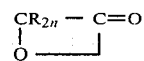

where n is from 2 to 9 and the R's are hydrogen, alkyl, cycloalkyl, alkoxy and single ring aromatic hydrocarbon radicals. Preferred lactones are the epsilon-caprolactones where n equals 5. Polyols, such as the above described diols and triols are used in the reaction with the lactone.

Polyester polyols, commonly referred to as epoxy esters, can also be used. Such polyols are made from the reaction of a polyepoxide resin with carboxylic acid.

Examples of polyether polyols are polyalkylene ether polyols which include those having the following structural formula:

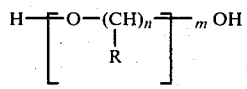

where the substituent R is hydrogen or lower alkyl containing from 1 to 5 carbon atoms including mixed substituents, n is from 2 to 6 and m is from 10 to 100. Included are poly (oxytetramethylene) glycols, poly-(oxyethylene) glycols, poly (oxy-1,2-propylene) glycols and the reaction products of ethylene glycol with a mixture of 1,2-propylene oxide and ethylene oxide.

Also useful are polyether polyols formed from oxyalkylation of various polyols, for example, glycols such as ethylene glycol, 1,6-hexanediol, and bisphenol A, or other higher polyols, such as trimethylolpropane and pentaerythritol. Polyols of higher functionality which can be utilized as indicated can be made, for instance, by oxyalkylation of compounds such as sorbitol or sucrose. One commonly utilized oxyalkylation method is by reacting a polyol with an alkylene oxide, for example, ethylene or propylene oxide, in the presence of an acidic or basic catalyst.

Polyamide polyol resins useful in the instant invention are produced using conventional techniques. In general, the resins are produced from any of the above-described polyacids or lactones and diols, triols and higher alcohols and small amounts of diamines or amino alcohols. Suitable diamines and amino alcohols include hexamethylene diamine, ethylene diamine, monoethanol amine, phenylene diamine, toluene diamine and diethanol amine. The molecular weight of the polyamide polyols is generally less than about 800.

Besides the above-mentioned polymeric polyols, polyurethane polyols can also be used. These polyols can be prepared by reacting any of the above-mentioned polyols with a minor amount of polyisocyanate (OH/NCO equivalent ratio greater than 1:1) so that free hydroxyl groups are present in the product. Mixtures of both high molecular weight and low molecular weight polyols may be used. Among the low molecular weight polyols are diols and triols such as aliphatic polyols including alkylene polyols containing from 2 to 18 carbon atoms. Examples include ethylene glycol, 1,4-butanediol, 1,6-hexanediol and cycloaliphatic polyols such as 1,2-hexanediol and cyclohexanedimethanol. Examples of triols include trimethylolpropane and trimethylolethane. Useful high molecular weight polyols are those described above. Also useful are polyols containing ether linkages such as diethylene glycol and triethylene glycol. Also, acid-containing polyols such as dimethylolpropionic acid and amino alkyl alcohols such as ethanol amine and diethanol amine can be used.

The organic isocyanate which is used to prepare the polyurethane polyols can be an aliphatic or an aromatic isocyanate or a mixture of the two. The aliphatic isocyanates are preferred when exterior durability is a requisite. Also, diisocyanates are preferred although higher polyisocyanates and monoisocyanates can be used in place of or in combination with diisocyanates. When higher functionality polyisocyanates are used, some monofunctional isocyanate may be present. Examples of suitable higher polyisocyanates are 1,2,4-benzene triisocyanate and polymethylene polyphenyl isocyanate. Examples of suitable monoisocyanates are butyl isocyanate, cyclohexyl isocyanate, phenyl isocyanate and toluene isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, alpha, alpha -xylylene diisocyanate and 4-4-methylene-bis-(cyclohexyl isocyanate).

The polyurea polyol resins are generally produced by reacting any of the above-described polyisocyanates with either an amino alcohol, such as monoethanol amine, or an amino alcohol and a diol. Preferably, for high solids compositions, the molecular weights of the polyurea polyols are less than about 800 where no alkylene oxide groups are present and preferably lower than 1,000 where one or two alkylene oxide groups per hydroxy group is present.

Suitable cyclic nitrogen containing polyols include such compounds as tris (hydroxyethyl) isocyanurate (THEIC), N,N'-bis (hydroxyethyl)-dimethyl hydantoin (BHDH), 1,4-bis [4,4-bis (hydroxymethyl)-1,3-oxazol-2-ene-2-yl] butane, hydroxyalkylated THEIC, hydroxyalkylated BHDH, bis (hydroxyethyl) ethylene urea, and 4,4-bis (hydroxymethyl)-1,3-oxazolidin-2-one.

All of the above described curable polyols require a crosslinking agent to cure to a durable film. The crosslinking agent used with the above-described polyols is selected from the group consisting of aminoplast resins, phenoplast resins, blocked or unblocked isocyanate resins and mixtures thereof. The aminoplast resins are preferred.

Aminoplast resins are based on the addition products of formaldehyde, with an amino- or amido-group carrying substance, e.g., urea, ethylene diurea, ethylene urea, melamine and benzoguanamine. Condensation products obtained from the reaction of alcohols and formaldehyde with melamine, urea or benzoguanamine are preferred herein. Useful alcohols used to make etherified products are monohydric alcohols such as methanol, ethanol, propanol, butanol, benzyl alcohol and butoxyethanol. An etherified melamineformaldehyde resin is the preferred aminoplast resin.

Several different isocyanate crosslinking agents can be used. Examples include the aliphatic compounds such as trimethylene, tetramethylene, pentamethylene, hexamethylene, 1,2-propylene, 1,2 butylene, 2,3-butylene, 1,3-butylene, ethylidine and butylidene diisocyanates; the cycloalkylene compounds such as 1,3-cyclopentane, 1,4-cyclohexane and 1,2-cyclohexane diisocyanates; the aromatic compounds, such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds, such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyldimethyl methane-2,2',5,5'-tetraisocyanate and the polymerized polyisocyanates such as tolylene diisocyanate dimers and trimers.

Blocked isocyanates useful as a crosslinking agent are derived from any of the many organic isocyanates available. Examples include p-phenylene diisocyanate; biphenyl diisocyanate; toluene diisocyanate; 3,3'-dimethyl-4,4'-biphenylene diisocyanate; 1,4-tetramethylene diisocyanate; hexamethylene diisocyanate; 2,2,4-trimethylhexane-1,6-diisocyanate; methylene bis-(phenylisocyanate); isophorone diisocyanate; 1,2,4-benzene triisocyanate; polymethylene polyphenyl isocyanate; bis(isocyanatocyclohexyl) methane; and methyl cyclohexyl diisocyanate, as well as derivatives thereof. Typical blocking agents are the phenols, thiols, oximes, caprolactams, and secondary aromatic amines. Many of these compounds are commercially available. "The Chemistry of Organic Film Formers", Robert E. Krieger Pub. Co., copyrighted 1977, by D. H. Solomon, pp. 216–217, contains a description of many blocked isocyanates that can be used here. The disclosure of this publication is herein incorporated by reference.

Phenoplast resins include the condensation product of an aldehyde with a phenol. Formaldehyde is a preferred aldehyde. Various phenols can be used, e.g., phenol per se, cresol, para-phenylphenol, para-tertiaryphenol, para-tertiaryamylphenol and cyclopentylphenol. The methylol phenol ethers described in U.S. Pat. No. 2,597,330 (herein incorporated by reference) are especially useful.

The ratio of the polyol to the crosslinking agent ranges from about 20:80 to about 80:20, preferably from about 35:65 to about 65:35.

There are also polyol-containing acrylics which are useful as the film-forming components. Of these, one type must be externally combined with crosslinking agents such as the above described aminoplast resins, phenoplast resins, isocyanate resins, or blocked isocyanates, while one type already contains a crosslinking agent internally.

In a preferred embodiment of this aspect of the invention, thermosetting acrylic resins comprising the hydroxyalkyl esters of ethylenically-unsaturated carboxylic acids and at least one other ethylenically unsaturated monomer copolymerizable therewith, such as are described in U.S. Pat. Nos. 2,681,897 and 3,084,184 is used. The resin is curable by the addition of the above described aminoplast, phenoplast, isocyanate, or blocked isocyanate resins.

Preferred interpolymers of the class described are those containing hydroxyalkyl esters in which the alkyl group has up to about 18 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyalkyl) esters, as well as various other alkylene glycol esters of such acids and mixed alkyl hydroxyalkyl esters, such as butyl hydroxyethyl maleate and benzyl hydroxypropyl maleate. The corresponding monoesters, such as the mono (hydroxyethyl), mono (hydroxypropyl), and similar alkylene glycol monoesters of maleic acid and similar acids, can also be used, and for some purposes are preferred.

The monomer or monomers with which the hydroxyalkyl ester is interpolymerized can be any ethylenic compound copolymerizable with the ester, the polymerization taking place through the ethylenically unsaturated linkages. These include monoolefinic and, in minor amounts, polyolefinic hydrocarbons, halogenated monoolefinic and diolefinic hydrocarbons, unsaturated esters of organic and inorganic acids, esters or amides of unsaturated acids, nitriles, unsaturated acids, and the like. Examples of such monomers include styrene, 1,3-butadiene, 2-chlorobutene, acrylonitrile, alphamethyl styrene, alphachlorostyrene, 2-chloro-1,3-butadiene, 1,1-dichloroethylene, vinyl butyrate, vinyl acetate, vinyl chloride, allyl chloride, dimethyl maleate, divinyl benzene, diallyl itaconate, triallyl cyanurate, and the like. The preferred monomers are acrylates and methacrylates, such as ethyl acrylate, propyl acrylate, ethyl hexyl acrylate, acrylamide, methyl methacrylate, butyl methacrylate, and the like, as well as methacrylic and acrylic acid. These resins are combined with the aminoplast, phenoplast or isocyanate resins and are cured upon heating.

Another important class of thermosetting acrylic resins that are used comprises the crosslinking carboxyl-containing polymers. The thermosetting carboxyl polymers that are used herein consist generally of acrylic resins or modified acrylic resins containing from about 3 to about 40 percent by weight of ethylenically unsaturated acid. These interpolymers are curable when combined with a compound containing functional groups such as the above described aminoplast, phenoplast, isocyanate or blocked isocyanate resins.

Acrylic materials which may be used include acrylates, such as ethyl acrylate, butyl acrylate, and hexyl acrylate; methacrylates, such as methyl methacrylate, isopropyl methacrylate, acrylonitrile, and hexyl methacrylate; maleate esters, such as dibutyl maleate; and fumarates, such as ethyl fumarate.

The ethylenically unsaturated acids which may be used are those such as acrylic acid, methacrylic acid, fumaric acid, maleic acid, and itaconic acid.

The second type of polyol-containing acrylics comprises interpolymers of an unsaturated carboxylic acid amide with at least one other monomer having a $CH_2=C<$ group, said interpolymers being characterized by having amido hydrogen atoms replaced by the structure-$RCHOR_1$, wherein R is selected from the group consisting of hydrogen and saturated lower aliphatic hydrocarbon radicals and $R_1$ is a member of the class consisting of hydrogen and lower alkyl radicals. In general, these interpolymers can be produced in two ways. In the first method, the unsaturated carboxylic acid amide chosen is an N-alkoxymethyl acrylamide (i.e., a material having an —$NHRCHOR_1$ group in the molecule). This N-alkoxymethyl acrylamide is then polymerized with at least one other monomer having a $CH_2=C<$ group to produce a useful interpolymer. In the second method, an unsaturated carboxylic acid amide e.g., acrylamide is polymerized with at least one other monomer having a $CH_2=C<$ group and is then reacted with an aldehyde to form a useful interpolymer.

Examples of the interpolymers usable and their methods of manufacture are disclosed in U.S. Pat. Nos. 2,870,117, 2,978,434, 3,035,965 and 3,079,434. These interpolymers contain hydroxyl groups.

The interpolymers of unsaturated carboxylic acid amides (as defined above) are the preferred thermosetting acrylic resins to be used in this invention. This acrylic resin type is curable in and of itself and need not be combined with a crosslinking agent. If desired, however, crosslinking agents can be added.

Among the monomers which may be polymerized with the unsaturated carboxylic acid amides are acrylates such as methyl acrylate, ethyl acrylate, isobutyl acrylate, and hexyl acrylate; styrene, vinyl toluene, maleate esters, such as dibutyl maleate; acidic materials such as acrylic acid, methacrylic acid, and maleic anhydride; vinyl ethers; vinyl ketones; vinyl pyridines, allyl acetoacetates; glycidyl acrylates; methacrylamide; dimethylbenzyl methacrylate; hydroxy-substituted acrylics, such as hydroxyethyl acrylate; and the adducts of epsilon-caprolactone and hydroxyalkyl acrylates. In general, a preferred group of monomers includes ethyl acrylate, butyl acrylate, methyl acrylate, styrene, vinyl toluene, acrylonitrile, acrylic acid, monomethyl styrene and hydroxyethyl acrylate.

It has been found that preferred unsaturated carboxylic acid amide interpolymers are obtained when at least two monomeric compounds are interpolymerized with the N-alkoxymethylacrylamide-containing or the amide-containing material. In this manner, it is possible to tailor the interpolymer to have any desired degree of hardness or flexibility. For example, one useful ternary interpolymer is prepared from the acrylamide, hydroxyethyl acrylate and methyl methacrylate, this interpolymer then being reacted with an aldehyde to produce a material useful in this invention.

It is known that small amounts of methyl methacrylate tend to improve the hardness of multi-component interpolymers where one of the monomers is of the type which forms soft homopolymers. It has also been found that a small quantity of an acid monomer, such as acrylic acid, methacrylic acid, crotonic acid, maleic acid or fumaric acid, is particularly useful as an internal catalyst in that it imparts to the coating composition desirable fast curing properties. In place of acrylamide, any other polymerizable amide, for example, methacrylamide or itaconic diamide, may be utilized.

The N-alkoxymethyl acrylamides useful in this invention are known in the art, and include such materials as N-alkoxymethyl acrylamides, N-alkoxymethyl methacrylamides, alkoxymethyldiacetone acrylamides, 0-(acryloxyethyl)-N-(alkoxymethyl) carbamates, N-methyl-N-alkoxymethylacrylamides, and the like. Specific examples include N-butoxymethylacrylamide, isobutoxymethylacrylamide, N-(methoxyethoxymethyl) acrylamide, methoxymethyldiacetoneacrylamide, O-(methacryloxyethyl)N-methoxymethyl carbamate and hydroxymethylacrylamide.

These resins are cured in the presence or absence of added aminoplast resin or phenolic resin. In general, the internal curing agent comprises from about one to about 25 percent by weight of the acrylic interpolymer.

Resins with ethylenic unsaturation are included at a level of about 5 percent to about 60 percent, preferably from about 10 percent to about 40 percent, in the compositions of this invention. Several different resins having the ethylenic unsaturation are known and are useful herein. They can be prepared by first forming a polymeric backbone having reactive sites. The polymer is then reacted with an unsaturated compound having at least one functional group which will react with the reactive sites on the backbone. The usual reactive sites attached directly or indirectly to the polymer are hydroxy, amino, carboxy, carbamyl, isocyanato or epoxy. Hydroxy or carboxy are most often used. When the reactive sites are hydroxy, the unsaturated compound usually has carboxy, haloformyl (most often chloroformyl) or isocyanato functionality. When the reactive sites on the polymer are amino, the unsaturated compound usually has isocyanato, haloformyl (again, most often chloroformyl) or epoxy functionality. When the reactive sites on the polymer are carboxy, the unsaturated compound generally has hydroxy, epoxy or isocyanato functionality. When the reactive sites are carbamyl, they are usually reacted with formaldehyde to produce N-methylol carbamyl groups. When the reactive sites are isocyanato, the unsaturated compound ordinarily contains hydroxy or carboxy functionality. When the reactive sites are epoxy (usually glycidyl), the unsaturated compound generally has carboxy functionality. The unsaturated compound ordinarily contains carboxy, haloformyl or isocyanato functionality.

The polymer having reactive sites attached thereto can itself be of many types, e.g., polyacrylates, polyamides, polyesters and polyurethanes. Such polymers are well known. Specific examples of these polymers as well as the unsaturated compounds reacted with the polymers are found in U.S. Pat. No. 4,048,036, Prucnal, Sept. 13, 1977 (the disclosure of which is herein incorporated by reference).

Another class of resins useful herein are the alkyd resins. Such resins are polyesters of polyhydroxyl alcohols and polycarboxyl acids chemically combined with various drying, semi-drying and non-drying oils in different proportions. Thus, for example, the alkyd resins are made from polycarboxylic acids such as maleic acid, fumaric acid and maleic anhydride. The polyhydric alcohols which are reacted with the polycarboxylic acid include glycerol, trimethylolethane, trimethylolpropane, pentaerythirol, sorbitol, manitol, ethylene glycol, diethylene glycol and 2,3-butylene glycol.

The alkyd resins are produced by reacting the polycarboxylic acid and the polyhydric alcohol together with a drying, semi-drying or non-drying oil in proportions depending upon the properties desired. The oils are coupled into the resin molecule by esterification during the manufacturing and become an integral part of the polymer. The oil is fully saturated or predominately unsaturated. The fully saturated oils tend to give a plasticizing effect to the alkyd, whereas the predominately unsaturated oils tend to cross-link and dry rapidly with oxidation to give more tough and durable alkyd resins. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties.

Also useful herein are polyester type resins. As conventionally used and as used herein, the term "polyester" is applied to resins which contain no oil or fatty acid modification. That is, while the above-described alkyd resins are in the broadest sense polyester type resins, they are oil-modified and thus not generally considered a polyester resin. The unsaturated polyesters resins are derived from unsaturated polyfunctional acids and polyhydric alcohol. These polyesters are essentially linear in structure. Maleic acid and fumaric acid are the usual unsaturated acid components. Commonly used polyhydric alcohols are ethylene glycol, propylene glycol, diethylene glycol, dipropylene glycol, butylene glycol, glycerol, trimethylol propane, pentaerythritol and sorbitol. Oftentimes a saturated acid will be included in the reaction to provide desirable properties. Examples of saturated acids include phthalic acid, isophthalic acid, adipic acid, azelaic acid, sebacic acid and the anhydrides thereof where they exist.

A preferred class of resins having ethylenic unsaturation are polyester resins having an allyloxy content of at least about 5 percent. These resins are made by reacting (1) an alcohol having a hydroxyl functionality of at least 1 and an allyloxy functionality of at least 1, provided the total hydroxyl and allyloxy functionalities are at least 3 with (2) a dicarboxylic acid. Such resins based on the saturated dicarboxylic acids are more fully described in commonly assigned, copending application "Low Temperature Curing Polyester Resins and Coating Compositions", Beuchler et al, Ser. No. 102,493, filed Dec. 11, 1979. As described therein, preferred alcohols have a hydroxyl functionality of 2 and allyloxy functionality of 1. Examples of the alcohols used to make the polyester resins include trimethylolpropane monoallyl ether, trimethylolpropane diallyl ether, glycerol allyl ether, pentaerythritol diallyl ether, pentaerythritol triallyl ether and glycerol diallyl ether. Examples of saturated acids include phthalic acid, isophthalic acid, terephthalic acid, succinic acid, glutaric acid, adipic acid, suberic acid, azelaic acid, sebacic acid, cyclohexane dicarboxylic acid, and the anhydrides thereof where they exist. (As used herein, dicarboxylic acids or anhydrides which contain only aromatic unsaturation are considered to be saturated since the aromatic double bonds do not react by addition. The alcohol and saturated dicarboxylic acid are reacted at an equivalent ratio of from about 0.9:1 to about 1.4:1 at a temperature ranging from about 160° C. to about 210° C. These polyester resins are preferred because of their capability of curing at low temperatures. However, useful polyester resins derived from an alcohol having the aforementioned hydroxyl and allyloxy functionalities and unsaturated dicarboxylic acids or anhydrides can also be made using the above reactant ratios and temperatures. Suitable unsaturated dicarboxylic acids and anhydrides include maleic acid, maleic anhydride and fumaric acid.

It should be understood a resin can be made which contains ethylenic unsaturation and has hydroxyl functionality. Thus, the attributes provided by the polyol-containing resin and the resin having ethylenic unsaturation are both found in one resin.

It is preferred that the coating compositions herein be sprayable when they have a low organic solvent content, i.e., below about 40 percent, more preferably below about 25 percent. Normally, this low level of organic solvent is included in the composition for flowability and processing. Solvents such as the ketones, ethylene glycol monoalkyl ether acetates, the mono- and dialkyl ethers of ethylene and propylene glycol, xylene, toluene and lower alcohols can be used. Other coating composition additives including pigments, fillers, antioxidants, flow control agents, initiators, driers, promoters, surfactants and catalysts can also be included in the compositions. Generally, such components do not exceed about 3 percent of the composition.

The coating compositions can be applied to a variety of substrates using any conventional method including spraying, dipping and flow coating. Suitable substrates include plastics, wood, ceramic, metal, wallboard, etc. However, the compositions are especially useful for the coating of sheet molding compounds such as used for producing lightweight, rust-free automotive parts. The compositions impart a desired appearance to the substrate as well as providing good hardness and solvent- and chip-resistance. The compositions are especially useful as a primer composition because of its adhesion to the substrate.

The compositions are intended as a one-pack coating composition. However, at the time of use, a cure accelerator can be included in the composition. Normally, the coatings after application are subjected to a low bake to effect a cure. Temperatures of about 80° C. to about 130° C. for at least about 20 minutes are satisfactory to effect a cure. Somewhat lower temperatures and times can be used when the cure accelerator is included in the compositions.

The examples which follow illustrate the claimed invention, with Example IV representing a preferred embodiment.

EXAMPLE I

A coating composition of this invention is made as follows. First a pigment paste containing the following components is formulated:

|  | % |
| --- | --- |
| Polyurethane polyol (1) | 14.4 |
| Aminoplast resin (2) | 14.7 |
| Barytes pigment | 20.3 |
| China clay | 20.3 |
| Lampblack pigment | 4.6 |
| Organo titanate | 0.8 |
| Ethanol | 7.5 |
| Ethylene glycol monoethyl ether acetate | 10.6 |
| Acetone | 6.8 |
|  | 100.0 |

(1) Reaction product of 2,2-dimethyl-,3-hydroxypropyl 2,2-dimethyl-3-hydroxypropionate (available from Union Carbide Corp. as Ester Diol 204), hexamethylene diisocyanate-based isocyanate prepolymer (available from Mobay Chemical Corp. as Mondur HX), dibutyltin laurate and a polyester (available from Union Carbide Corp. PCP0300).
(2) Methylated melamine available from American Cyanamid Corp. as Cymel 303.

The above components are blended together and passed through a mill with zircoa media (2 times) to get a Hegman pigment grind reading of 7. The pigment paste is then blended with the following components to produce a coating composition.

|  | % |
| --- | --- |
| Dicyclopentenyl-containing methacrylate (3) | 13.7 |
| Polyurethane polyol (4) | 0.1 |
| Polyester resin (5) | 12.8 |
| Aminoplast resin (4) | 0.1 |
| Hexane diol diacrylate | 12.9 |
| Pigment paste | 52.8 |
| Methyl ethyl ketoxime | 0.6 |
| Para-toluene sulfonic acid | 0.8 |
| Diisopropanol amine | 0.4 |
| Water | 0.4 |
| Cobalt accelerator | 0.5 |
| Acetone | 4.9 |
|  | 100.0 |

(3) Available from Rohm and Haas Co. as QM657.
(4) As found in the pigment paste.
(5) Trimethylolpropane monoallyl ether adipate derived from the reaction of 1 mole trimethylolpropane monoallyl ether and 1.1 moles adipic acid.

The above composition is spray applied to a sheet molding compound substrate and dried at 120° C. to provide a 1 mil film. The adhesion to the substrate is satisfactory and the coating has good chip and solvent resistance.

EXAMPLE II

Another useful coating composition is as follows:

|  | % |
| --- | --- |
| Dicyclopentenyl-containing methacrylate (1) | 26.4 |
| Polyurethane polyol (1) | 0.1 |
| Polyester resin (1) | 12.7 |
| Pigment paste (1) | 53.0 |
| Aminoplast resin (1) | 0.1 |
| Methyl ethyl ketoxime | 0.6 |
| Para-toluene sulfonic acid | 0.8 |
| Diisopropanol amine | 0.4 |
| Water | 0.4 |
| Cobalt accelerator | 0.5 |
| Acetone | 5.0 |

(1) As used in Example I.

A substrate made of sheet molding compound is sprayed with the above composition to give a 1 mil film. The film, which acts as a primer, has a good appearance and good adhesion.

EXAMPLE III

The use of a polyol-containing acrylic resin in place of the polyurethane polyol of Example II at the same level also gives a useful coating composition. The polyol-containing acrylic resin is derived from 11.8% hydroxyethylacrylate, 4.7% methacrylic acid, 5.5% styrene, 17.9% ethyl hexyl acrylate and 60.1% isobutyl methacrylate.

EXAMPLE IV

The following composition is made:

|  | % |
| --- | --- |
| Dicyclopentenyl-containing methacrylate (1) | 16.6 |
| Polyurethane polyol (1) | 0.2 |
| Polyester resin (1) | 13.9 |
| Pigment paste (1) | 53.5 |
| Aminoplast resin (1) | 8.9 |
| Para-toluene sulfonic acid | 0.7 |
| Diisopropanol amine | 0.4 |
| Water | 0.4 |
| Cobalt octoate (12% solution) | 0.2 |
| Iron napthenate (6% solution) | 0.4 |

-continued

| | % |
|---|---|
| Zirconium octoate (6% solution) | 0.4 |
| Acetone | 4.4 |
| | 100.0 |

(1) As used in Example I.

Films formed from the above composition have good adhesion to sheet molding compound substrates and provide a good appearance.

EXAMPLE V

A composition with satisfactory characteristics is also obtained when isobornyl methacrylate is used in Example I in place of the dicyclopentenyl-containing methacrylate at the same level.

What is claimed is:

1. A high solids content coating composition consisting essentially of, on a film-forming resin solids basis:
    (a) from about 10 percent to about 80 percent of an ethylenically unsaturated monomer;
    (b) from about 5 percent to about 50 percent of a polyol-containing curable resin having a hydroxyl value of at least about 10;
    (c) from about 5 percent to about 60 percent of a resin having ethylenic unsaturation, said resin being preferred by first forming a polymeric backbone having reactive sites and then reacting this polymer with an unsaturated compound having at least one functional group which will react with the reactive sites on the backbone, thereby resulting in a polymeric backbone with pendant side chains having ethylenic unsaturation; and
    (d) a crosslinking agent at a ratio of polyol to crosslinking agent from about 80:20 to about 20:80.

2. The composition of claim 1 wherein the resin having ethylenic unsaturation is a polyester resin having an allyloxy side chain content of at least about 5 percent and is derived from the reaction of (1) alcohol having a hydroxyl functionality of at least 1 and an allyloxy functionality of at least 1, provided the total hydroxyl and allyloxy functionalities is at least 3 with (2) a dicarboxylic acid or anhydride.

3. The composition of claims 1 or 2 wherein the ethylenically unsaturated monomer is selected from the group consisting of vinyl aromatic compounds, unsaturated esters of organic and inorganic acids, carboxylic acids, acrylonitriles and substituted acrylonitriles, acrylamides and substituted acrylamides, and mixtures thereof.

4. The composition of claims 1 or 2 wherein the polyol-containing resin is selected from the group consisting of hydrocarbon polyols, ester polyols, ether polyols, polyester polyols, polyether polyols, polyamide polyols, polyurethane polyols, polyurea polyols, cyclic nitrogen-containing polyols, acrylic polyols, and mixtures thereof.

5. The composition of claims 1 or 2 wherein the crosslinking agent is an aminoplast resin, said aminoplast resin based on the addition product of formaldehyde with an amino- or amido-group carrying substance.

6. A high solids content coating composition consisting essentially of, on a film-forming resin solids basis:
    (a) from about 10 percent to about 80 percent of dicyclopentenyl-containing methacrylate;
    (b) from about 5 percent to about 50 percent of polyurethane polyol;
    (c) from about 5 percent to about 60 percent of trimethylolpropane monoallyl ether adipate; and
    (d) a crosslinking agent, wherein the ratio of polyurethane polyol to crosslinking agent ranges from about 80:20 to about 20:80.

7. The composition of claim 6 wherein the crosslinking agent is methylated melamine-formaldehyde.

8. The composition of claim 1 consisting essentially of:
    (a) from about 20 percent to about 50 percent of the ethylenically unsaturated monomer;
    (b) from about 15 percent to about 25 percent of the polyol-containing resin;
    (c) from about 10 percent to about 40 percent of the resin having ethylenic unsaturation; and
    (d) a crosslinking agent at a ratio of polyol to crosslinking agent of from about 80:20 to about 20:80.

9. The composition of claim 1 or 8 wherein the ethylenically unsaturated monomer has alpha,beta unsaturation.

10. The composition of claim 8 wherein the composition is sprayable at a solids content of less than 40 percent organic solvent.

11. The composition of claims 1 or 8 additionally consisting essentially of a peroxide cure accelerator.

* * * * *